United States Patent
Gold et al.

(10) Patent No.: US 9,148,411 B2
(45) Date of Patent: Sep. 29, 2015

(54) KNOWN PLAINTEXT ATTACK PROTECTION

(71) Applicant: Cisco Technology Inc., San Jose, CA (US)

(72) Inventors: Martin Gold, Winchester (GB); Keith Millar, Haywards Heath (GB); Harel Cain, Jerusalem (IL); David Wachtfogel, Jerusalem (IL); Michal Devir, Haifa (IL); Max Berman, D.N. Harei Yehuda (IL); Brett Walzer, Givat Zeev (IL)

(73) Assignee: Cisco Technology Inc., San Jose, CA (US)

( * ) Notice: Subject to any disclaimer, the term of this patent is extended or adjusted under 35 U.S.C. 154(b) by 0 days.

(21) Appl. No.: 14/111,659

(22) PCT Filed: Dec. 18, 2012

(86) PCT No.: PCT/IB2012/057428
§ 371 (c)(1),
(2) Date: Oct. 18, 2013

(87) PCT Pub. No.: WO2013/114166
PCT Pub. Date: Aug. 8, 2013

(65) Prior Publication Data
US 2014/0052983 A1 Feb. 20, 2014

Related U.S. Application Data

(60) Provisional application No. 61/632,877, filed on Feb. 1, 2012.

(51) Int. Cl.
*H04L 29/06* (2006.01)
*H04L 9/00* (2006.01)

(52) U.S. Cl.
CPC ............ H04L 63/0428 (2013.01); H04L 9/002 (2013.01)

(58) Field of Classification Search
CPC .............. H04L 63/0428; H04L 63/164; H04L 63/1441; H04L 2209/34; G06F 21/10
USPC ........................................................ 713/160
See application file for complete search history.

(56) References Cited

U.S. PATENT DOCUMENTS 8,280,044 B2 * 10/2012 Takatsu ........................... 380/42
2007/0140477 A1 * 6/2007 Wise ............................... 380/28

(Continued)

FOREIGN PATENT DOCUMENTS

EP     2 148 462 A1    1/2010

OTHER PUBLICATIONS

Apr. 26, 2013 Transmittal of International Search Report and Written Opinion of the International Searching Authority for PCT/IB2012/057428.

(Continued)

*Primary Examiner* — Fikremariam A Yalew
(74) *Attorney, Agent, or Firm* — Hahn Loeser & Parks LLP

(57) ABSTRACT

A Headend system including a encoder to encode input data yielding a plurality of data packets, each of the packets having a header and a payload, a post encoding processor to identify ones of the data packets having a payload with a suspected known plaintext, and modify at least some of the identified packets, and an encryption processor to encrypt at least some of the data packets yielding encrypted data packets. Related apparatus and methods are also described.

16 Claims, 6 Drawing Sheets

(56) References Cited

U.S. PATENT DOCUMENTS

| | | | |
|---|---|---|---|
| 2008/0002567 A1* | 1/2008 | Bourlas et al. | 370/208 |
| 2009/0028331 A1* | 1/2009 | Millar et al. | 380/255 |
| 2010/0008497 A1* | 1/2010 | Takatsu | 380/42 |
| 2010/0135486 A1 | 6/2010 | Schneider | |
| 2011/0119480 A1* | 5/2011 | Massoudi et al. | 713/150 |
| 2012/0219154 A1* | 8/2012 | Bandholz et al. | 380/287 |
| 2013/0010600 A1* | 1/2013 | Jocha et al. | 370/236.2 |
| 2013/0058485 A1* | 3/2013 | Xin et al. | 380/270 |

OTHER PUBLICATIONS

David Davis, "Use extended ping and extended traceroute to better troubleshoot your Cisco network," (Oct. 16, 2008) (available at www.techrepublic.com/forum/discussions/102-276629).

Erik Twes et al., "Breaking DVB-CSA," *West European Workshop on Research in Cryptography; Conference Record*, pp. 41-45 (Jul. 22, 2011).

Erik Tews et al., "Breaking DVB-CSA," *WEWoRC 2011, LNCS 7242*, pp. 45-61 (Springer-Verlag 2012).

\* cited by examiner

KNOWN PLAINTEXT ATTACK PROTECTION

RELATED APPLICATION INFORMATION

The present application is a 35 USC §371 application of PCT/IB2012/057428, filed on 18 Dec. 2012 and entitled "Known Plaintext Attack Protection", which was published on 8 Aug. 2013 in the English language with International Publication Number WO 2013/114166 and which relies for priority on U.S. Provisional Patent Application Ser. No. 61/632,877 of Gold, et al., filed 1 Feb. 2012.

FIELD OF THE INVENTION

The present invention relates to protection against known plaintext attacks.

BACKGROUND OF THE INVENTION

The following references are believed to represent the state of the art:

Article entitled "Breaking DVB-CSA" by Erik Tews, Julian Walde, and Michael Weiner published in the conference record of the West European Workshop on Research in Cryptography, Weimar, Germany, Jul. 20-22, 2011; and A discussion in a forum at techrepublic.com/forum/discussions/102-276629.

SUMMARY OF THE INVENTION

The present invention, in certain embodiments thereof, seeks to provide an improved system for protection against plaintext attacks.

There is thus provided in accordance with an embodiment of the present invention, a system including an encoder to encode input data yielding a plurality of data packets, each of the packets having a header and a payload, a post encoding processor to identify ones of the data packets having a payload with a suspected known plaintext, and modify at least some of the identified packets, and an encryption processor to encrypt at least some of the data packets yielding encrypted data packets.

Further in accordance with an embodiment of the present invention, the post encoding processor is operative to modify the payload of the at least some identified packets so that the payload of each of the at least some identified packets is no longer a suspected known plaintext, and the encryption processor is operative to encrypt the data packets yielding the encrypted data packets.

Still further in accordance with an embodiment of the present invention, the post encoding processor is operative to replace at least some of the data of the payload of each of the at least some identified packets with random or pseudo-random data.

Additionally in accordance with an embodiment of the present invention, the post encoding processor is operative to replace at least some of the data of the payload of each of the at least some identified packets with other broadcast data.

Moreover in accordance with an embodiment of the present invention, the other broadcast data is selected from at least one of an entitlement management message (EMM), an entitlement control message (ECM), electronic program guide data, event information table (EIT) data, non-zero audio data, non-zero video data and metadata for the audio data or the video data.

Further in accordance with an embodiment of the present invention, the post encoding processor is operative to remove the payload of the at least some identified packets so that the payload of each of the at least some identified packets no longer exists, and for each one of the at least some identified packets, add an adaptation field to the one identified packet or lengthen a pre-existing adaptation field of the one identified packet, and the encryption processor is operative to encrypt the data packets having the payload yielding the encrypted data packets but not to encrypt the data packets without the payload.

Still further in accordance with an embodiment of the present invention, the post encoding processor is operative to reduce the length of the payload of each of the at least some identified packets to less than a certain length, and add an adaptation field to each of the at least some identified packets or lengthen a pre-existing adaptation field of each of the at least some identified packets, and the encryption processor is operative to encrypt the data packets having the payload with a length greater than or equal to the certain length yielding the encrypted data packets but not encrypt the data packets having the payload with a length less than the certain length.

Additionally in accordance with an embodiment of the present invention, the certain length is equal to eight bytes.

Moreover in accordance with an embodiment of the present invention, each of the bytes of the payload with the known plaintext is only selected from a value of zero and FF.

Further in accordance with an embodiment of the present invention, the input data encoded by the encoder is video data.

Still further in accordance with an embodiment of the present invention, the post encoding processor is operative to compare the payload of each of the data packets with at least one suspected known plaintext in order to identify the data packets having the payload with a suspected known plaintext.

Additionally in accordance with an embodiment of the present invention, the post encoding processor is operative to search the payload of each of the packets in order to find packets with matching payloads, select packets from the matching payload packets where the same payload repeats in accordance with at least one frequency requirement, and assign the selected packets as suspected known plaintext packets.

Moreover in accordance with an embodiment of the present invention, the encryption processor is operative to encrypt the at least some data packets in accordance with a plurality of cryptoperiods and a plurality of keys such that a different one of the keys is used to encrypt the data packets in a different one of the cryptoperiods, and the at least one frequency requirement is that there could potentially be matching payload packets having the same payload at least once in each of the cryptoperiods.

Further in accordance with an embodiment of the present invention, the encoder is operative to add a continuity counter to the header of each of the packets, and the post encoding processor is operative to change the continuity counter of at least some of the packets to compensate for the modification of the at least some identified packets.

There is also provided in accordance with still another embodiment of the present invention, a method including encoding input data yielding a plurality of data packets, each of the packets having a header and a payload, identifying ones of the data packets having a payload with a suspected known plaintext, modifying at least some of the identified packets, and encrypting at least some of the data packets yielding encrypted data packets.

There is also provided in accordance with still another embodiment of the present invention, a system including an encoder to encode input data yielding a plurality of data packets, each of the packets having a header and a payload, a post encoding processor to search the payload of each of the packets in order to find packets with matching payloads, select packets from the matching payload packets where the same payload repeats in accordance with at least one frequency requirement, and assign the selected packets as suspected known plaintext packets.

Still further in accordance with an embodiment of the present invention, at least some of the data packets will be encrypted in accordance with a plurality of cryptoperiods and a plurality of keys such that a different one of the keys is used to encrypt the data packets in a different one of the cryptoperiods, and the at least one frequency requirement is that there could potentially be matching payload packets having the same payload at least once in each of the cryptoperiods.

There is also provided in accordance with still another embodiment of the present invention, a method including encoding input data yielding a plurality of data packets, each of the packets having a header and a payload, searching the payload of each of the packets in order to find packets with matching payloads, selecting packets from the matching payload packets where the same payload repeats in accordance with at least one frequency requirement, and assigning the selected packets as suspected known plaintext packets.

BRIEF DESCRIPTION OF THE DRAWINGS

The present invention will be understood and appreciated more fully from the following detailed description, taken in conjunction with the drawings in which.

DETAILED DESCRIPTION OF AN EMBODIMENT

Figure 1:
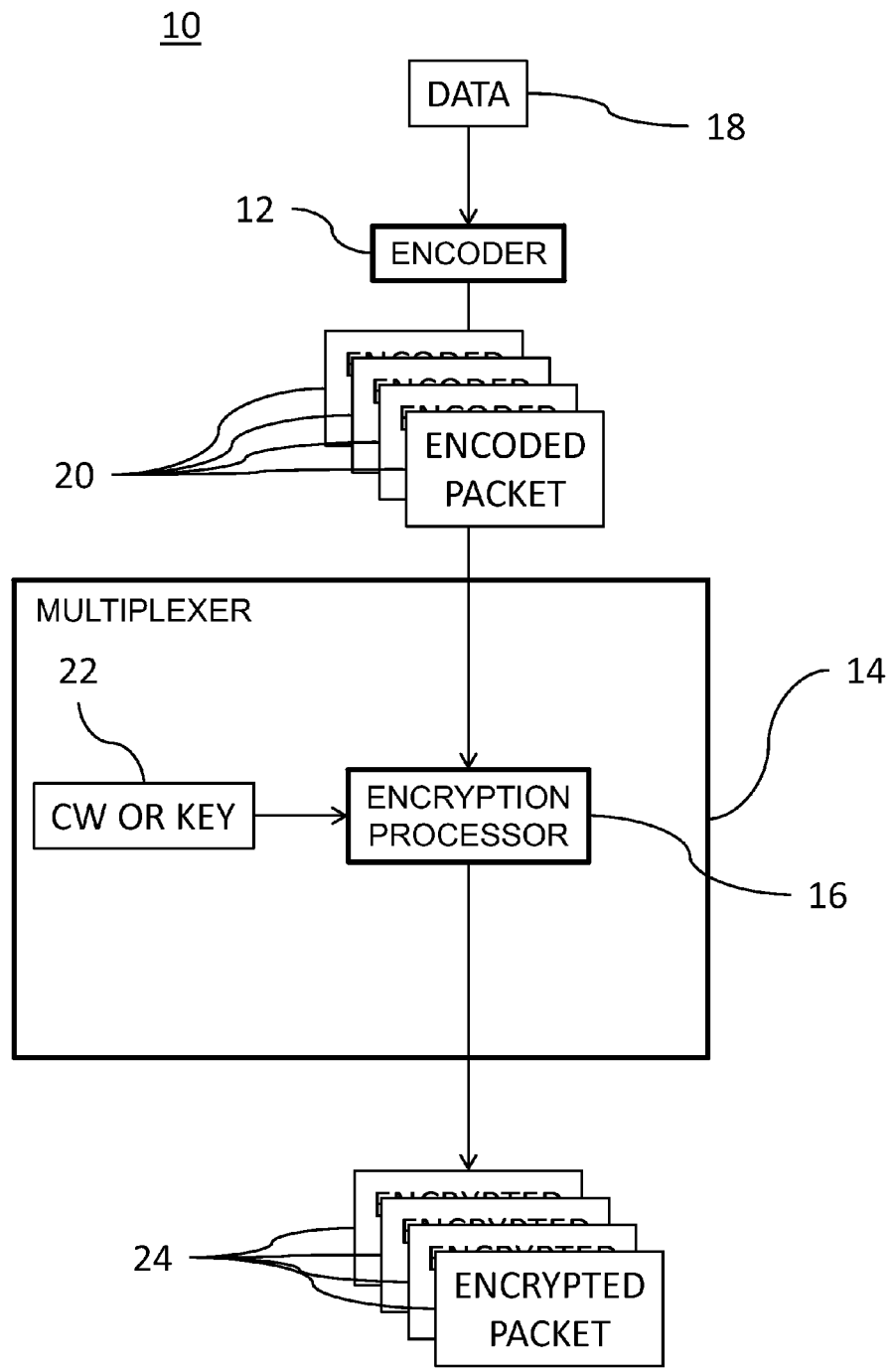
FIG. 1 is a partly pictorial, partly block diagram view of a Headend system encoding and encrypting data.

Persons skilled in the art will appreciate that, throughout the present application, a Headend is used by way of example only, and that the present invention is not limited to a particular type of content server, but rather includes any suitable device, for example, but not limited to, a video-on-demand server or a mobile phone relay station or a broadcast channel Headend.

The term "encoded" is used throughout the present specification and claims, in all of its grammatical forms, to refer to any type of data stream encoding including, for example and without limiting the scope of the definition, well known types of encoding such as, but not limited to, MPEG-2 encoding, H.264 encoding, VC-1 encoding, and synthetic encodings such as Scalable Vector Graphics (SVG) and LASER (ISO/IEC 14496-20), and so forth. It is appreciated that an encoded data stream generally requires more processing and typically more time to read than a data stream which is not encoded. Any recipient of encoded data, whether or not the recipient of the encoded data is the intended recipient, is, at least in potential, able to read encoded data without requiring cryptanalysis. It is appreciated that encoding may be performed in several stages and may include a number of different processes, including, but not necessarily limited to: compressing the data; transforming the data into other forms; and making the data more robust (for instance replicating the data or using error correction mechanisms).

The term "compressed" is used throughout the present specification and claims, in all of its grammatical forms, to refer to any type of data stream compression. Compression is typically a part of encoding and may include image compression and motion compensation. Typically, compression of data reduces the number of bits comprising the data. In that compression is a subset of encoding, the terms "encoded" and "compressed", in all of their grammatical forms, are often used interchangeably throughout the present specification and claims.

Similarly, the terms "decoded" and "decompressed" are used throughout the present specification and claims, in all their grammatical forms, to refer to the reverse of "encoded" and "compressed" in all their grammatical forms.

The terms "scrambled" and "encrypted", in all of their grammatical forms, are used interchangeably throughout the present specification and claims to refer to any appropriate scrambling and/or encryption methods for scrambling and/or encrypting a data stream, and/or any other appropriate method for intending to make a data stream unintelligible except to an intended recipient(s) thereof. Well known types of scrambling or encrypting include, but are not limited to DES, 3DES, CSA and AES. Similarly, the terms "descrambled" and "decrypted" are used throughout the present specification and claims, in all their grammatical forms, to refer to the reverse of "scrambled" and "encrypted" in all their grammatical forms.

Pursuant to the above definitions, the terms "encoded"; "compressed"; and the terms "scrambled" and "encrypted" are used to refer to different and exclusive types of processing. Thus, a particular data stream may be, for example:

encoded, but neither scrambled nor encrypted;
compressed, but neither scrambled nor encrypted;
scrambled or encrypted, but not encoded;
scrambled or encrypted, but not compressed;
encoded, and scrambled or encrypted; or
compressed, and scrambled or encrypted.

Likewise, the terms "decoded" and "decompressed" on the one hand, and the terms "descrambled" and "decrypted" on the other hand, are used to refer to different and exclusive types of processing.

Reference is now made to FIG. 1, which is a partly pictorial, partly block diagram view of a Headend system 10 encoding and encrypting data.

The Headend system 10 includes an encoder 12 and a multiplexer 14. The multiplexer includes an encryption processor 16.

The encoder 12 is operative to encode data 18, for example, but not limited to, audio or video data, yielding a plurality of encoded packets 20. The encoding may be performed in accordance with any suitable encoding standard, for example, but not limited to, MPEG-2, MPEG-4 or VC-1.

The encoded packets 20 are typically encrypted by the encryption processor 16 based on a key or control word 22 thereby yielding a plurality of encrypted packets 24. In order to enhance security the control word 22 is typically changed periodically according to a plurality of cryptoperiods.

Figure 2:
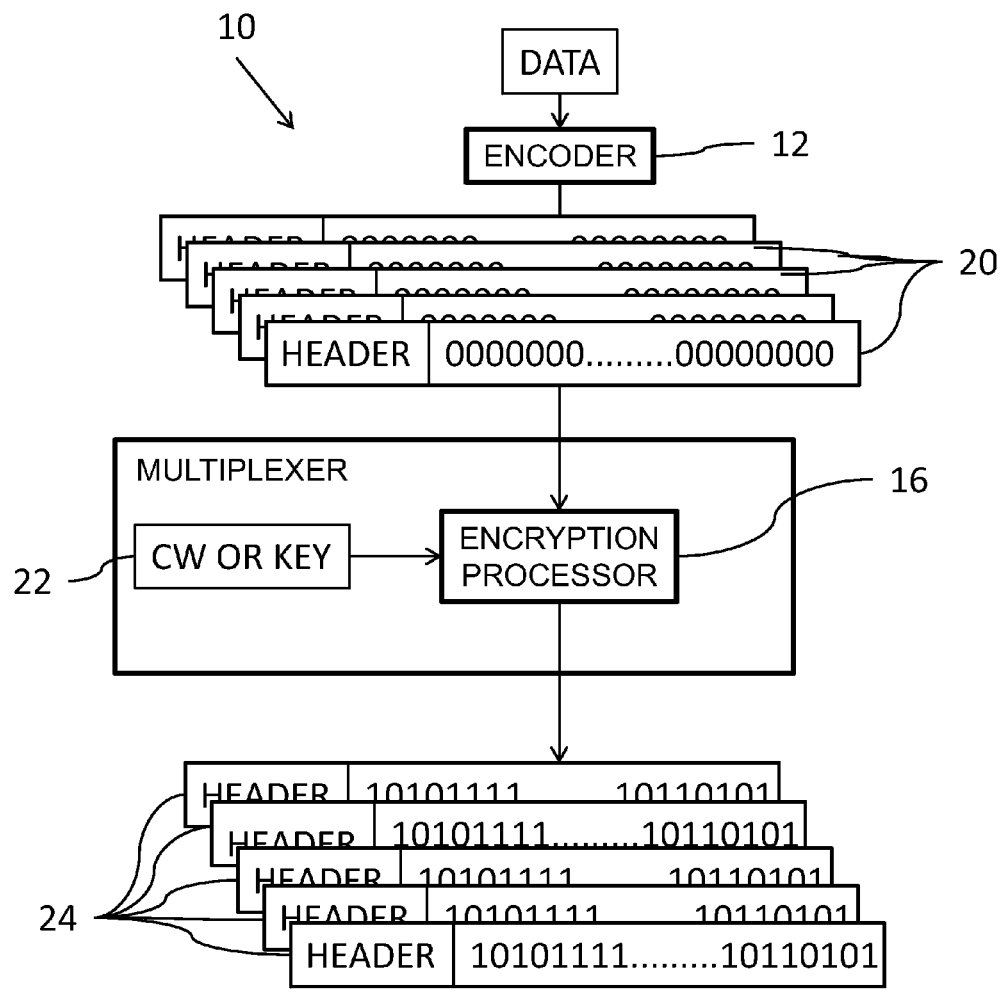
FIG. 2 is a partly pictorial, partly block diagram view of a known plaintext attack against the Headend system of FIG. 1.

Reference is now made to FIG. 2, which is a partly pictorial, partly block diagram view of a known plaintext attack against the Headend system 10 of FIG. 1.

In some encryption systems such as DVB CSA, every plaintext packet 20 is encrypted independently so that the same plaintext packet payload on encryption (in the same cryptoperiod) yields the same ciphertext packet payload. Therefore, packets 20 having the same payload may be identified with ease and possibly subject to a plaintext attack. As an aside, even without repetition, known plaintext attacks may be mounted if the position of a known plaintext in the stream is known to the attacker or the known plaintext can be otherwise identified. However, due to the complex structure of DVB CSA changing a single bit of the plaintext payload in DVB CSA generally changes the entire ciphertext. Therefore, as DVB CSA was designed to encrypt video and audio packets which are generally dynamic, ciphertext of video and audio packets are generally not subject to plaintext attacks. The term DVB CSA is defined herein to any other relevant version of DVB CSA, for example, but not limited to, DVB CSA2.

However, it has been discovered that the encoder 12 may produce some encoded packets 20 where the payload of the encoded packets 20 is the same. For example, MPEG-2 encoders may produce some encoded packets 20 where the payload includes only zeros. It is believed that one reason for the outputting of the "zero payload" packets 20 is because the encoder 12 pre-allocates a certain amount of packets for a frame of video, and if the encoder 12 succeeds to compress a video frame into less packets than the pre-allocated amount, the encoder 12 creates the remaining pre-allocated packets 20 with zeros. Therefore, the encoder 12 may regularly output "zero payload" packets 20 so that in each cryptoperiod, the encoder 12 is outputting one or more "zero payload" packets 20.

Therefore, an attacker may identify the ciphertext of a known plaintext (in this case the "zero payload" packets 20) and mount a plaintext attack using any suitable method, for example, a time memory trade off (TMTO) or rainbow table and determine the control word 22.

It should be noted that known plaintext is not only limited to "zero payload" packets 20, but will include any packets 20 which repeat with enough frequency or otherwise known to an attacker even without repetition, for example, but not limited to, packets 20 wherein the value of each byte in the payload of each packet 20 is either zero or FF.

A suspected known plaintext, as used in the claims and specification, is defined herein as any plaintext which could possibly be known to an attacker due to repetition, known location and/or another method of identification to enable an attacker to mount a plaintext attack to determine the cryptographic key encrypting the ciphertext.

Figure 3:
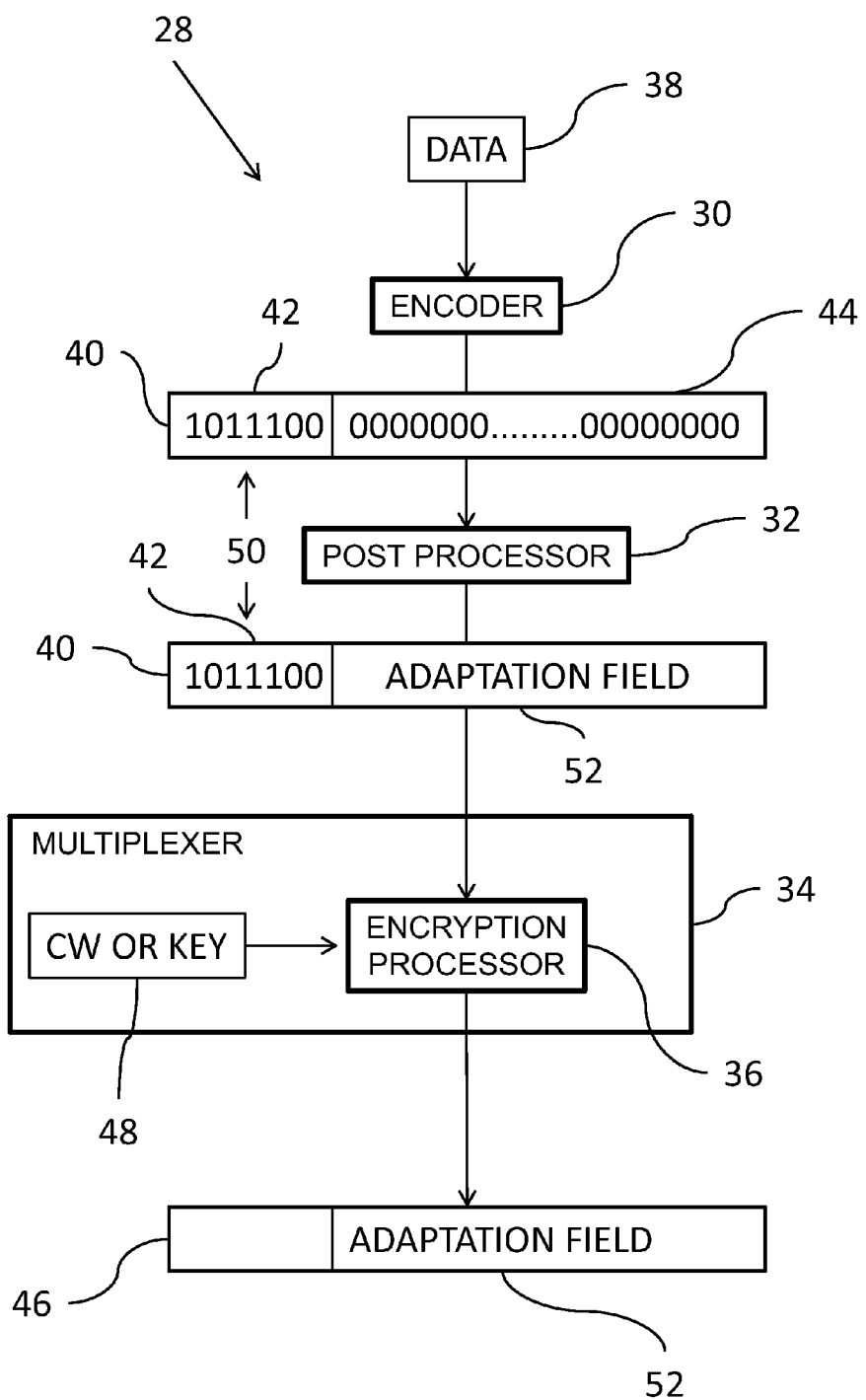
FIG. 3 is a partly pictorial, partly block diagram view of a Headend system with known plaintext attack protection constructed and operative in accordance with a first embodiment of the present invention.

Reference is now made to FIG. 3, which is a partly pictorial, partly block diagram view of a Headend system 28 with known plaintext attack protection constructed and operative in accordance with a first embodiment of the present invention.

The Headend system 28 typically includes an encoder 30, a post encoding processor 32 and a multiplexer 34. The multiplexer 34 typically includes an encryption processor 36. The post encoding processor 32 may be implemented as part of the encoder 30 or as part of the multiplexer 34 or as a separate processing unit or as part of another processor in the Headend system 28. The post encoding processor 32 may even be implemented as a remote service external to the Headend system 28 accessed via a suitable network or Internet connection, by way of example only.

The encoder 30 is typically operative to encode input data 38 yielding a plurality of data packets 40. The input data 38 encoded by the encoder is typically video or audio data. Each of the data packets 40 has a header 42 and a payload 44.

By way of introduction, in order to protect against known plaintext attacks, the post encoding processor 32 is functionally disposed between the output of the encoder 30 and the input of the encryption processor 36. The post encoding processor 32 identifies data packets 40 with a suspected known plaintext and modifies the identified data packets 40 so that a known plaintext attack cannot occur, as will now be described in more detail.

The post encoding processor 32 is typically operative to identify the data packets 40 having a payload with a suspected known plaintext, for example, but not limited to, wherein the payload 44 of the data packets 40 only includes zeros.

The post encoding processor 32 processor is operative to compare the payload 44 of each of the data packets 40 with one or more suspected known plaintexts in order to identify the data packets 40 having the payload 44 with a suspected known plaintext. Another method identifying known plaintext payloads 44 is based on looking at payload repetition and is described in more detail with reference to FIG. 6.

The post encoding processor 32 is operative to modify some or all of the identified packets 40. As described above with reference to FIG. 2, a known plaintext attack is possible even if only one known plaintext exists in each cryptoperiod. A known plaintext attack is typically easier when the known plaintext occurs more than once in a cryptoperiod. Therefore, it is better to modify all the identified packets 40 and not just some of them. However, just modifying some of the data packets 40 may offer some protection against attack and may be useful in some cases.

Different methods for modifying the identified data packets 40 are described with reference to FIGS. 3-5. Any one of these methods may be used to modify the identified data packets 40. However, it will be appreciated that one of the methods may be used for some of the identified packets 40 while other methods may be used to modify other identified data packets 40.

One method of modifying the identified data packets 40 is now described below.

The post encoding processor 32 is operative to: remove the payload 44 of some, or all, of the identified data packets 40 so that the payload 44 of each modified packet 40 no longer exists; and add an adaptation field 52 or lengthen a pre-existing adaptation field 52 of each of the modified packets 40 to take the place of the removed payload 44. An adaptation field is an MPEG feature for conveying certain information. The content of the adaptation field is generally not encrypted. It will be appreciated by those ordinarily skilled in the art that the Headend system 28 may be implemented in non-MPEG encoding environments employing features similar to the adaptation field, so that the newly created/lengthened field(s) taking the place of the payload 44 is not encrypted.

The flags of the adaptation field 52 may be set to zero and the stuffing bytes will then be defined by MPEG-2 as all ones. Alternatively, any private data could be inserted into the stuffing bits and the transport_private_data_flag is set to 1. It will be appreciated by those ordinarily skilled in the art that there are many other options for the content of the adaptation field 52.

First, as the payload 44 of the modified packets 40 no longer exists, an attacker can no longer learn anything from the payloads 44 of the modified packets 40 to mount a known plaintext attack. Additionally, the modified packets 40 are not typically encrypted by the encryption processor 36 as the modified packets 40 do not include a payload, therefore an attacker cannot learn anything from the modified packets 40 to mount a known plaintext attack.

The encryption processor 36 is typically operative to encrypt the data packets 40 having the payload 44 yielding encrypted data packets 46 but not to encrypt the data packets 40 not having the payload 44. The encryption processor 36 is operative to encrypt the data packets 40 in accordance with a plurality of cryptoperiods and a plurality of keys 48 such that a different key 48 is used to encrypt the data packets 40 in different cryptoperiods.

The above method of modifying the identified data packets 40 may be problematic in certain situations as will now be described below. The header 42 of each data packets 40 may include a continuity counter 50 added by the encoder 30. When the encoder 30 creates a packet 40 without a payload, the continuity counter 50 of that packet has the same value as the prior packet. The continuity counter 50 is then incremented for the next packet with a payload. Therefore, if the payload 44 of the data packets 40 is removed and replaced with the adaptation field 52, the incorrect use of the continuity counter 50 may cause problems in a receiver-decoder where the continuity counter 50 is used to detect packet loss or used for packet indexing and possibly cause problems in the multiplexer 34. Additionally, if the packet 40 after the known plaintext packet 40 includes video data then some of the final bits of the "known plaintext" packet 40 may be needed for the start of the video data of the next video packet.

In accordance with an embodiment of the present invention, the post encoding processor 32 is operative to change the continuity counter of the packets 40 so that the continuity counter 50 of each of the packets 40 without a payload has the same value as the previous packet 40 and the continuity counter 50 of the packets 40 with a payload increments sequentially so that the continuity counter 50 of each packet 40 with a payload is one count higher than the previous packet 40.

Although, the Headend system 28 has been described for use with an MPEG type system, it will be appreciated that Headend system 28 may be implemented for use with any suitable encoding standard, using any suitable encryption method and any suitable multiplexing system. The Headend system 28 is not limited to known plaintext where the payload only includes zeros, but may be implemented for any suitable known plaintext.

The identification performed by the post encoding processor 32 may be performed online or offline. In other words, the identification may be performed in batch and the modification of the identified packets may be performed at a later time once the identification process for a particular content item has been completed. Alternatively, the identification and modification may be performed at the same time in an online fashion so that as one packet is being screened for known plaintext another packet is modified.

Figure 4:
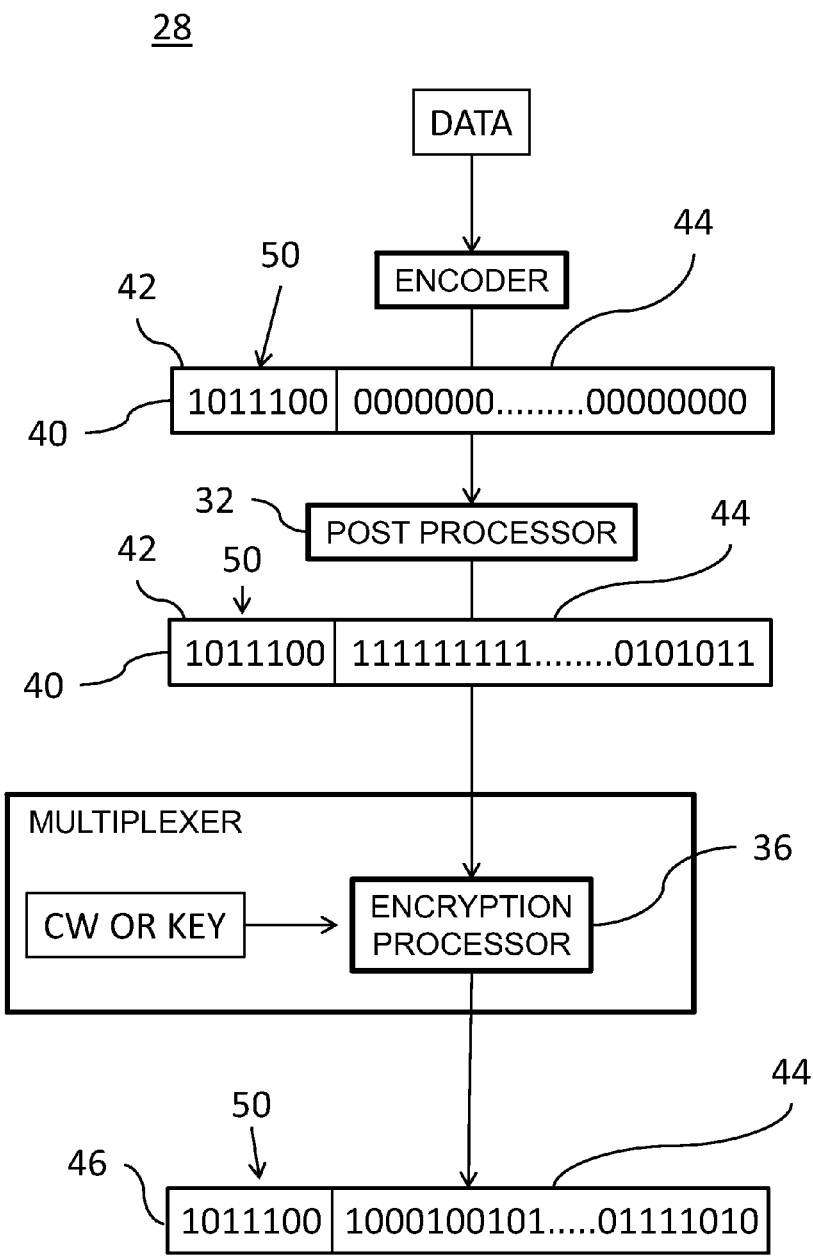
FIG. 4 is a partly pictorial, partly block diagram view the Headend system of FIG. 3 operating in accordance with an alternative mode of operation.

Reference is now made to FIG. 4, which is a partly pictorial, partly block diagram view the Headend system 28 of FIG. 3 operating in accordance with an alternative mode of operation.

Another method of modifying the identified packets 40 is now described below.

The post encoding processor 32 is operative to modify the payload 44 of some, or all, of the identified packets 40 so that the payload 44 of each modified packet 40 is no longer a suspected known plaintext.

As each modified data packet 40 still includes the payload 44, the encryption processor 36 is operative to encrypt the data packets 40, including the data packets 40 with the modified payload 44, yielding encrypted data packets 46.

The post encoding processor 32 may be operative to replace the payload 44 of some, or all, of the identified data packets 40 with random or pseudo-random data or other broadcast data, for example, but not limited to, an entitlement management message (EMM), an entitlement control message (ECM), electronic program guide data, event information table (EIT) data, non-zero audio data, non-zero video data and/or metadata for the audio data or the video data. The non-zero audio and video data may relate to content pushed to the storage devices of receiver-decoder devices (for example, a personal video recorder (PVR)) by a broadcaster or content provider or service provider.

If the payload 44 is replaced by random or pseudo-random data, the data needs to be carefully crafted in order not to confuse a receiver-decoder device which will be a recipient of the modified data packets 40.

One advantage of the modification method described with reference to FIG. 4 is that if the payload 44 is maintained and the packet ID (PID) remains unchanged (for example, when the data is replaced by random or pseudo-random data), then the continuity counter 50 is also maintained.

An additional advantage is that the modified payload may be utilized for carrying useful broadcast data thereby utilizing what would have been wasted bandwidth. However, when the modified payload 44 includes useful broadcast data, the PID of the modified packet 40 is often modified to reflect the change in the type of payload 44. Therefore, the continuity counter(s) of the data packets 40 may need to be modified so that for each PID which has a continuity counter 50, the continuity counter 50 in the header 42 of the data packets 40 with the payload 44 will be continuous without gaps. Therefore, the post encoding processor 32 is operative to change the continuity counter of some, or all, of the packets 40 to compensate for the modification of the identified packets 40.

Figure 5:
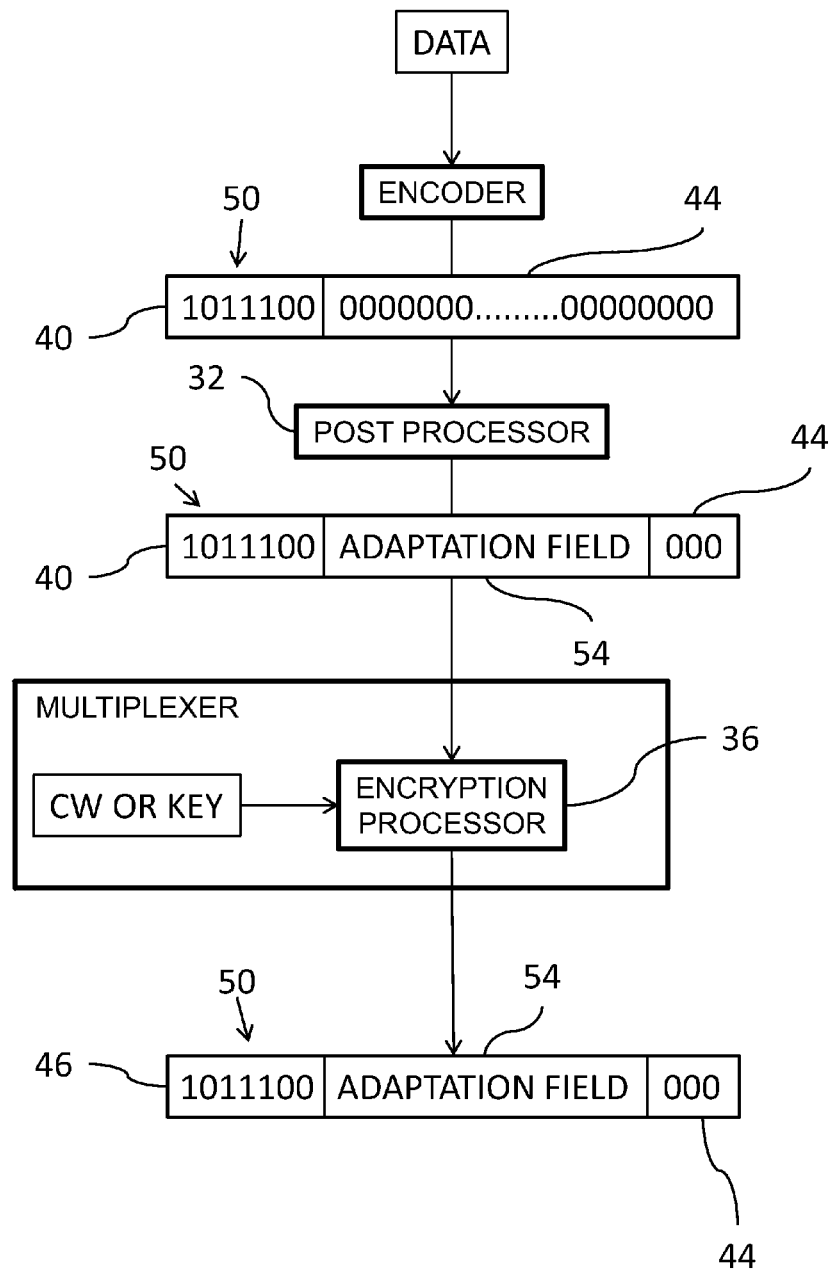
FIG. 5 is a partly pictorial, partly block diagram view of the Headend system of FIG. 3 in accordance with another alternative mode of operation.

Reference is now made to FIG. 5, which is a partly pictorial, partly block diagram view of the Headend system 28 of FIG. 3 in accordance with another alternative mode of operation.

Another method of modifying the identified packets 40 is now described below.

The post encoding processor 32 is operative to: reduce the length of the payload 44 of some, or all, of the identified packets 40 to less than a "certain" length; and add an adaptation field 54 to each modified packet 40 or lengthen a pre-existing adaptation field 54 of each modified packet 40 to compensate for the shortened payload 44. As described above with reference to FIG. 3, the content of the adaptation field is generally not encrypted. It will be appreciated by those ordinarily skilled in the art that the Headend system 28 may be implemented in non-MPEG encoding environments employing features similar to the adaptation field, so that the newly created/lengthened field(s) filling in for the shortened payload 44 is not encrypted.

In accordance with DVB CSA, packets with payloads of less than 8 bytes are not encrypted. Therefore, by reducing the payload 44 to between 2 and 7 bytes, the modified packets 40 are not encrypted and therefore an attacker cannot mount a plaintext attack based on the modified packets 40. Therefore, for a DVB CSA encryption system, the "certain" length is equal to eight bytes. It will be appreciated by those ordinarily skilled in the art that for other encryption systems the "certain" length may be different or not a relevant factor.

The formatting of the adaptation field 54 was discussed in more detail above with reference to FIG. 3.

One advantage of the modification method described with reference to FIG. 5 is that as the payload 44 is maintained (although reduced in length), the continuity counter 50 is also maintained.

Additionally, if the packet 40 after the known plaintext packet 40 includes video data then some of the "final bits" of the "known plaintext" packet 40 may be needed for the start of the video data of the next video packet and in the scenario described with reference to FIG. 5 the "final bit" data is maintained in the reduced payload 44.

The encryption processor 36 is operative to encrypt the data packets 44 having the payload 44 with a length greater than or equal to the "certain" length yielding the encrypted data packets 46 but not encrypt the data packets 40 having the payload 44 with a length less than the "certain" length.

Figure 6:
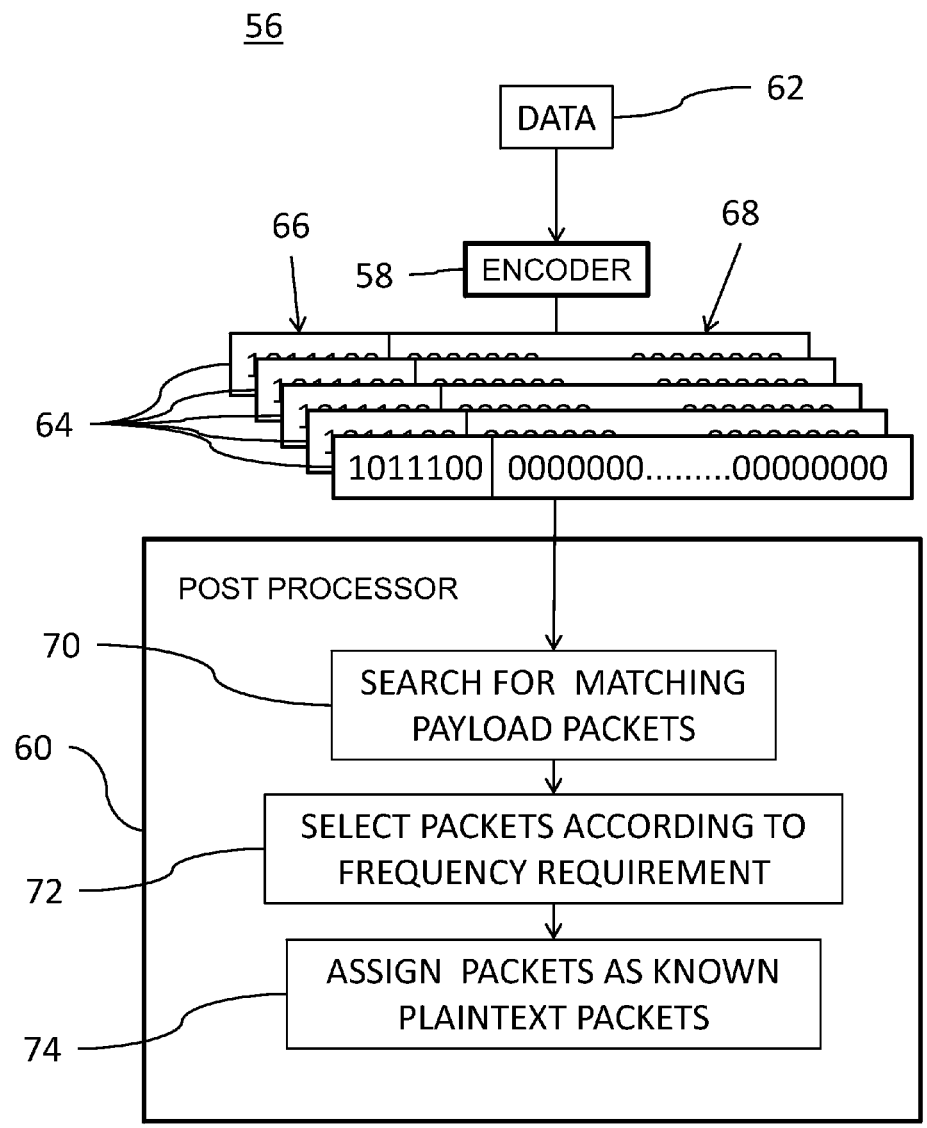
FIG. 6 is a partly pictorial, partly block diagram view of an encoding and post processing system with known plaintext attack protection constructed and operative in accordance with an embodiment of the present invention.

Reference is now made to FIG. 6, which is a partly pictorial, partly block diagram view of an encoding and post processing system 56 with known plaintext attack protection constructed and operative in accordance with an embodiment of the present invention.

The system 56 includes an encoder 58 and a post encoding processor 60.

The encoder 58 is operative to encode input data 62 yielding a plurality of data packets 64. Each packet 64 has a header 66 and a payload 68.

The post encoding processor 60 is operative to: search the payload 68 of each of the packets 64 in order to find packets 64 with matching payloads 68 (block 70); select packets 64 from the matching payload packets 64 where the same payload 68 repeats in accordance with one or more frequency requirements (block 72); and assign the selected packets 64 as suspected known plaintext packets 64 (block 74).

As only scrambled packets are useful for a hacker, the search step listed above (block 70) only needs to search packets 64 which will be encrypted. In many MPEG DVB systems, only packets with an audio or video packet ID (PID) are scrambled.

Broadly speaking, the frequency requirements are set to find packets which repeat with such frequency so that the data packets are useful for attackers to mount a known plaintext attack. An example of a frequency requirement is as follows.

When the data packets 64 will be encrypted (by the system 56 or another system) a plurality of cryptoperiods and a plurality of keys may be used such that a different key is used to encrypt the data packets in each different cryptoperiod. In such as case, the frequency requirements may include requiring that there could potentially be matching payload packets 64 having the same payload 68 at least once (or alternatively at least twice) in each cryptoperiod.

The system 56 may be a stand alone system or as part of a Headend system including packet modification, encryption and multiplexing.

In practice, some or all of these functions may be combined in a single physical component or, alternatively, implemented using multiple physical components. These physical components may comprise hard-wired or programmable devices, or a combination of the two. In some embodiments, at least some of the functions of the processing circuitry may be carried out by a programmable processor under the control of suitable software.

It is appreciated that software components of the present invention may, if desired, be implemented in ROM (read only memory) form. The software components may, generally, be implemented in hardware, if desired, using conventional techniques. It is further appreciated that the software components may be instantiated, for example, as a computer program product; on a tangible medium; or as a signal interpretable by an appropriate computer.

It will be appreciated that various features of the invention which are, for clarity, described in the contexts of separate embodiments may also be provided in combination in a single embodiment. Conversely, various features of the invention which are, for brevity, described in the context of a single embodiment may also be provided separately or in any suitable sub-combination.

It will be appreciated by persons skilled in the art that the present invention is not limited by what has been particularly shown and described hereinabove. Rather the scope of the invention is defined by the appended claims and equivalents thereof.

What is claimed is:

1. A system comprising:
   an encoder to encode input data yielding a plurality of data packets, each of the packets having a header and a payload;
   a post encoding hardware processor to:
   identify ones of the data packets having the payload with a suspected known plaintext; and
   based on identifying the data packets having the payload with a suspected known plaintext, for each of at least some of the identified packets with the payload having a suspected known plaintext: add an adaptation field or lengthen a pre-existing adaptation field; and reduce a length of the payload to less than a certain length, yielding a reduced payload; and
   an encryption processor to encrypt the data packets not having the reduced payload but not encrypt the data packets having the reduced payload wherein the data packets identified as having a suspected known plaintext and having the reduced payload are not encrypted.

2. The system according to claim 1, wherein:
   the post encoding processor is operative to remove the payload of the at least some identified packets so that the payload of each of the at least some identified packets no longer exists; and
   the encryption processor is operative to encrypt the data packets having the payload yielding the encrypted data packets but not to encrypt the data packets without the payload.

3. The system according to claim 1, wherein the certain length is equal to eight bytes.

4. The system according to claim 1, wherein the input data encoded by the encoder is video data.

5. The system according to claim 1, wherein the post encoding processor is operative to compare the payload of each of the data packets with at least one suspected known plaintext in order to identify the data packets having the payload with a suspected known plaintext.

6. The system according to claim 1, wherein the post encoding processor is operative to:
   search the payload of each of the packets in order to find packets with matching payloads;
   select packets from the matching payload packets where the same payload repeats in accordance with at least one frequency requirement; and
   assign the selected packets as suspected known plaintext packets.

7. The system according to claim 6, wherein:
   the encryption processor is operative to encrypt the at least some data packets in accordance with a plurality of cryptoperiods and a plurality of keys such that a different one of the keys is used to encrypt the data packets in a different one of the cryptoperiods; and the at least one frequency requirement is that there could potentially be matching payload packets having the same payload at least once in each of the cryptoperiods.

8. The system according to claim 2, wherein:
the encoder is operative to add a continuity counter to the header of each of the packets; and
the post encoding processor is operative to change the continuity counter of at least some of the packets to compensate for the modification of the at least some identified packets.

9. A method comprising:
encoding, by an encoder, input data yielding a plurality of data packets, each of the packets having a header and a payload;
identifying, by a post encoding hardware processor, ones of the data packets having the payload with a suspected known plaintext;
based on identifying the data packets having the payload with a suspected known plaintext, for each of at least some of the identified packets with the payload having a suspected known plaintext: adding, by the post encoding hardware processor, an adaptation field or lengthening a pre-existing adaptation field; and reducing, by the post encoding hardware processor, a length of the payload to less than a certain length, yielding a reduced payload; and
encrypting, by an encryption processor, the data packets not having the reduced payload but not encrypting the data packets having the reduced payload with a length less than the certain length wherein the data packets identified as having a suspected known plaintext and having the reduced payload are not encrypted.

10. The method according to claim 9, further comprising:
removing the payload of the at least some identified packets so that the payload of each of the at least some identified packets no longer exists; and
encrypting the data packets having the payload yielding the encrypted data packets but not encrypting the data packets without the payload.

11. The method according to claim 9, wherein the certain length is equal to eight bytes.

12. The method according to claim 9, wherein the input data encoded is video data.

13. The method according to claim 9, further comprising comparing the payload of each of the data packets with at least one suspected known plaintext in order to identify the data packets having the payload with a suspected known plaintext.

14. The method according to claim 9, further comprising:
searching the payload of each of the packets in order to find packets with matching payloads;
selecting packets from the matching payload packets where the same payload repeats in accordance with at least one frequency requirement; and
assigning the selected packets as suspected known plaintext packets.

15. The method according to claim 14, further comprising encrypting the at least some data packets in accordance with a plurality of cryptoperiods and a plurality of keys such that a different one of the keys is used to encrypt the data packets in a different one of the cryptoperiods and wherein the at least one frequency requirement is that there could potentially be matching payload packets having the same payload at least once in each of the cryptoperiods.

16. The method according to claim 10, further comprising:
adding a continuity counter to the header of each of the packets; and
changing the continuity counter of at least some of the packets to compensate for the modification of the at least some identified packets.

* * * * *